No. 698,104. Patented Apr. 22, 1902.
M. CLARK.
MACHINE FOR CUTTING PERFORATED SHEETS FOR AUTOMATIC MUSICAL INSTRUMENTS.
(Application filed May 2, 1898. Renewed Aug. 31, 1901.)
(No Model.) 6 Sheets—Sheet 1.

Witnesses.
Edward T. Wray.
Harry H. White.

Inventor.
Melville Clark
by Burton and Burton
his attys.

No. 698,104. Patented Apr. 22, 1902.
M. CLARK.
MACHINE FOR CUTTING PERFORATED SHEETS FOR AUTOMATIC MUSICAL INSTRUMENTS.
(Application filed May 2, 1898. Renewed Aug. 31, 1901.)
(No Model.) 6 Sheets—Sheet 2.
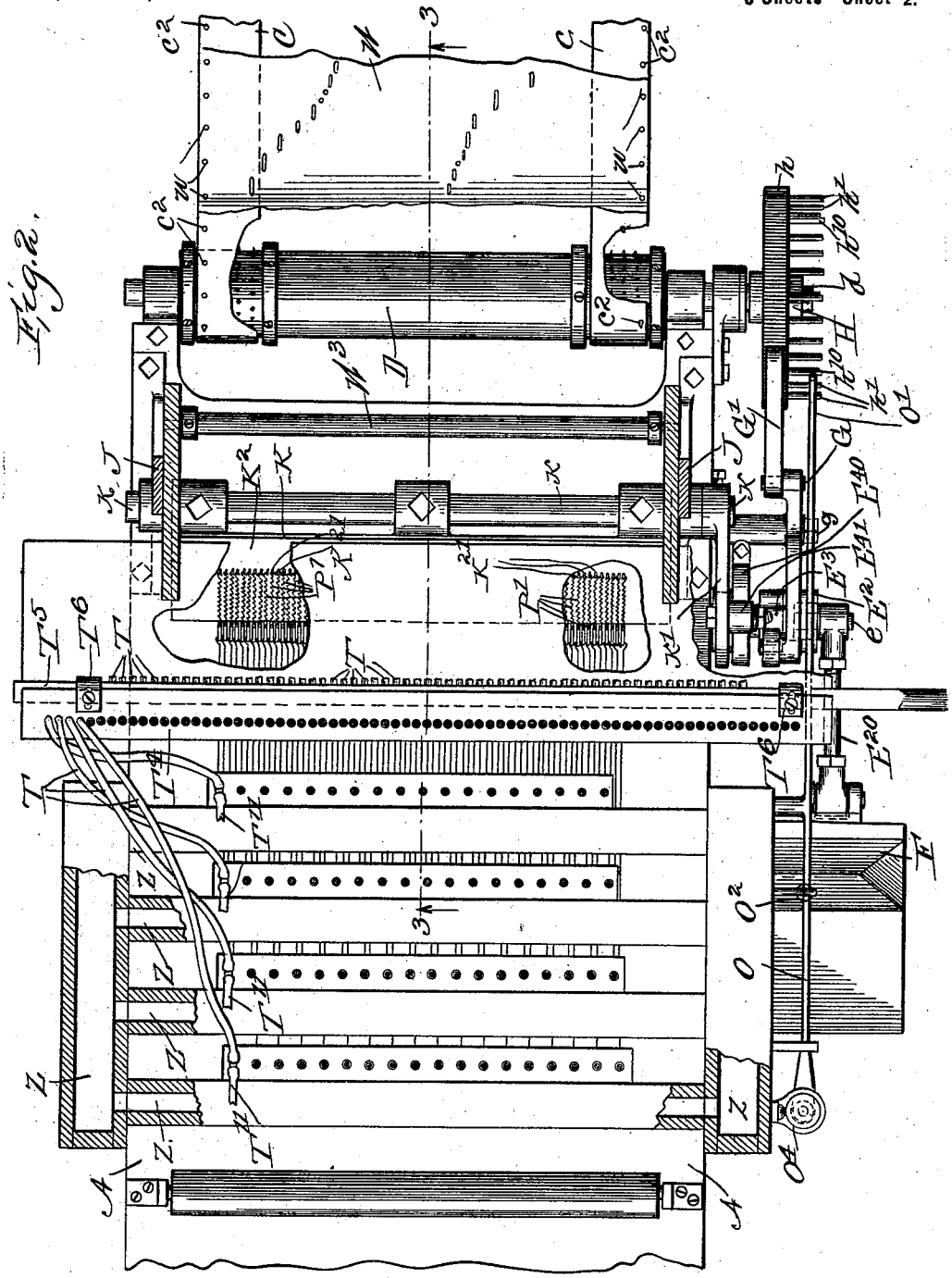

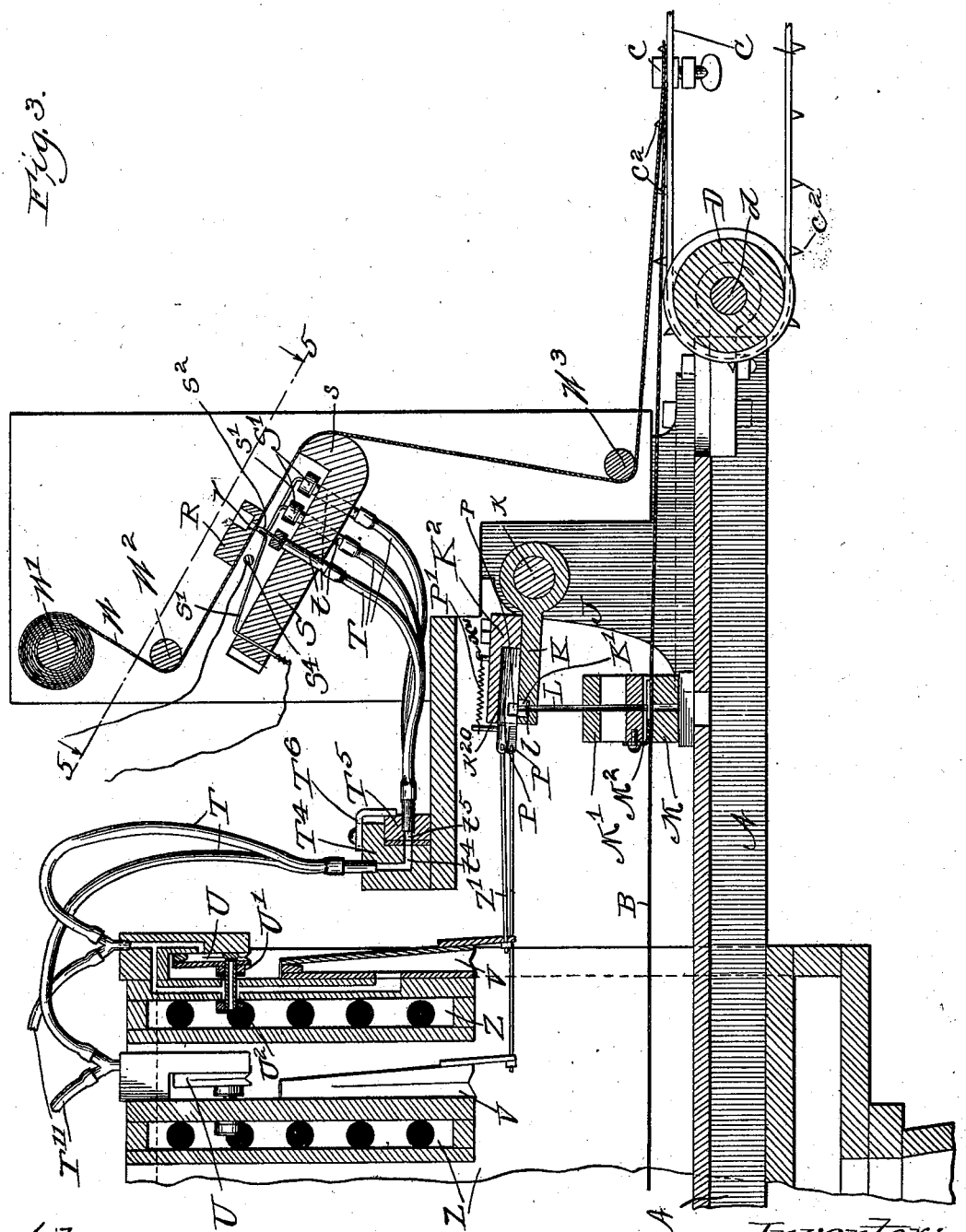

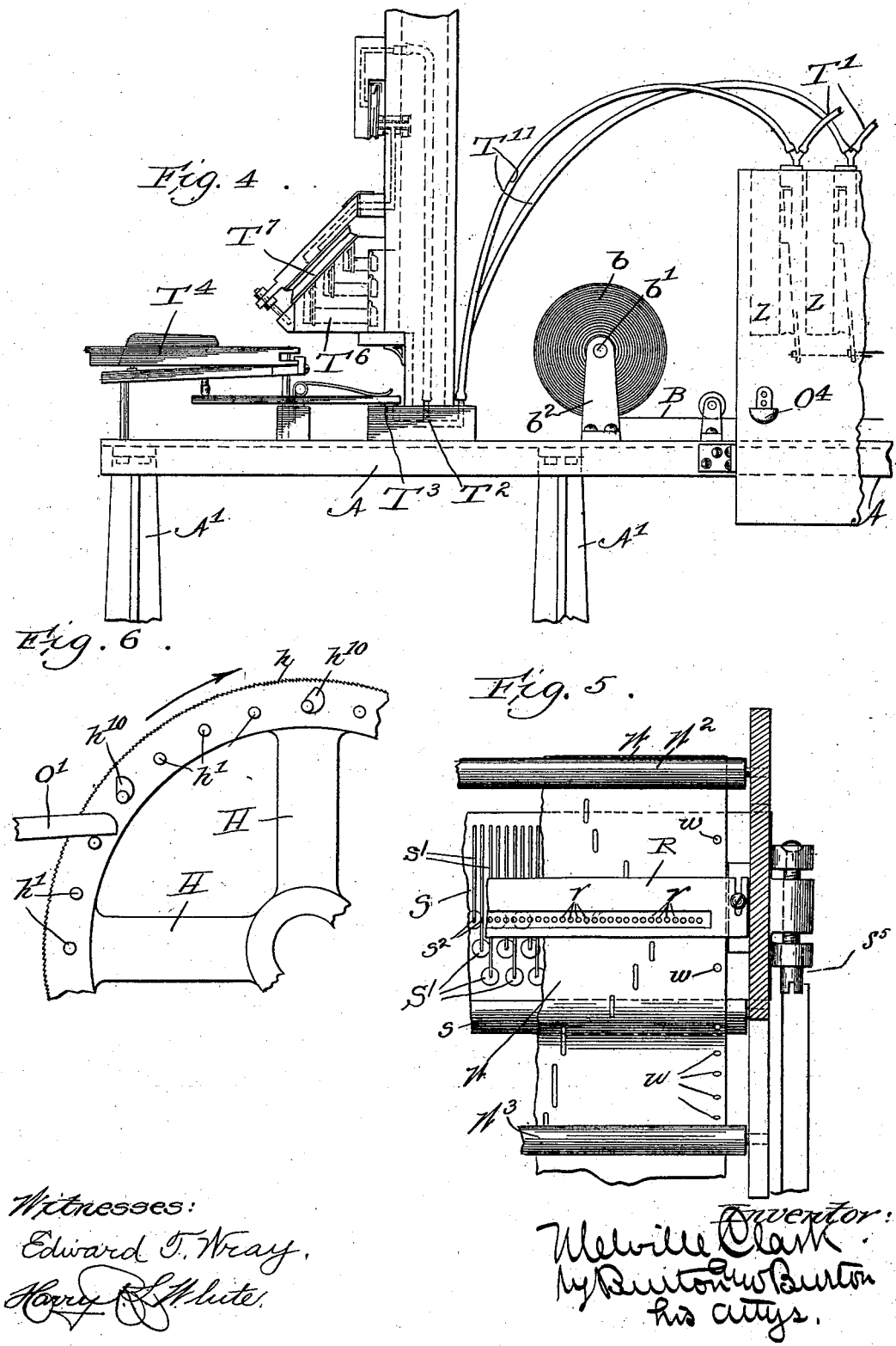

No. 698,104. Patented Apr. 22, 1902.
M. CLARK.
MACHINE FOR CUTTING PERFORATED SHEETS FOR AUTOMATIC MUSICAL INSTRUMENTS.
(Application filed May 2, 1898. Renewed Aug. 31, 1901.)
(No Model.) 6 Sheets—Sheet 5.
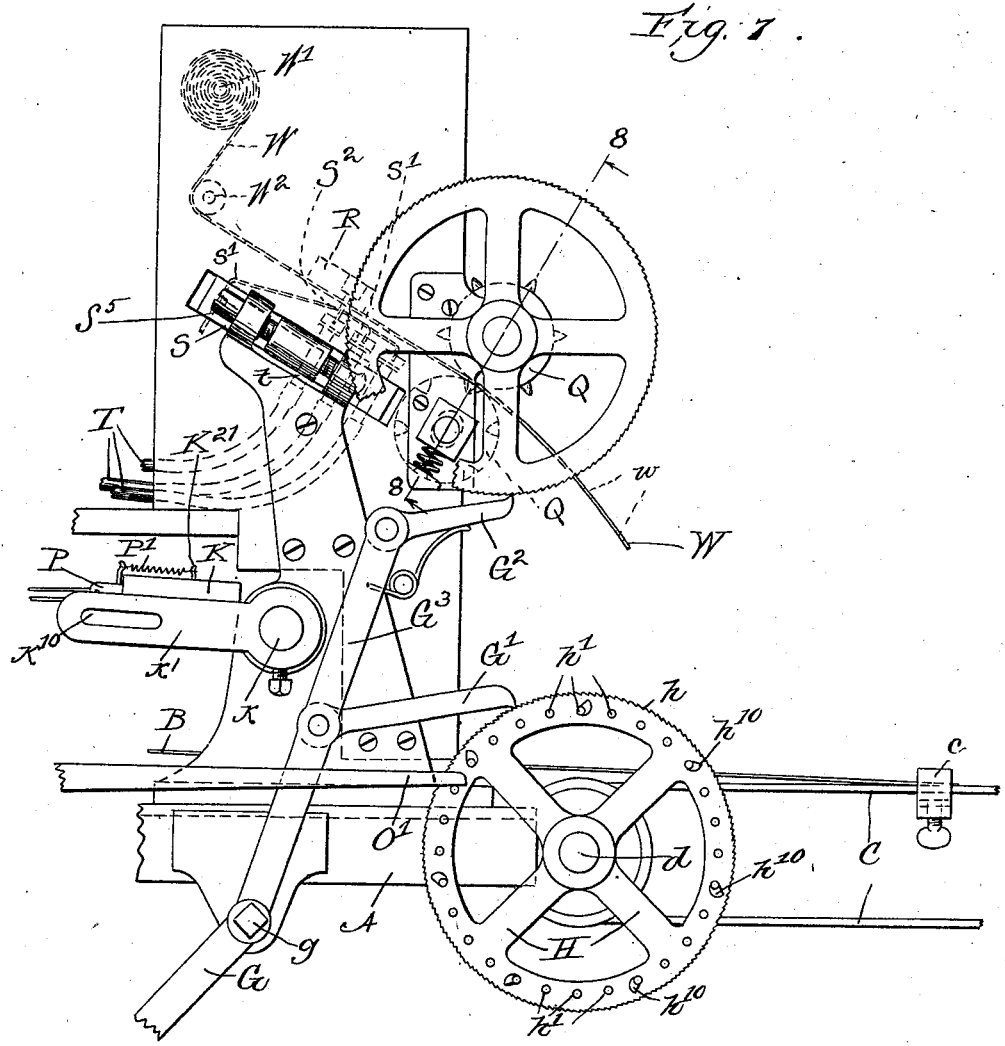
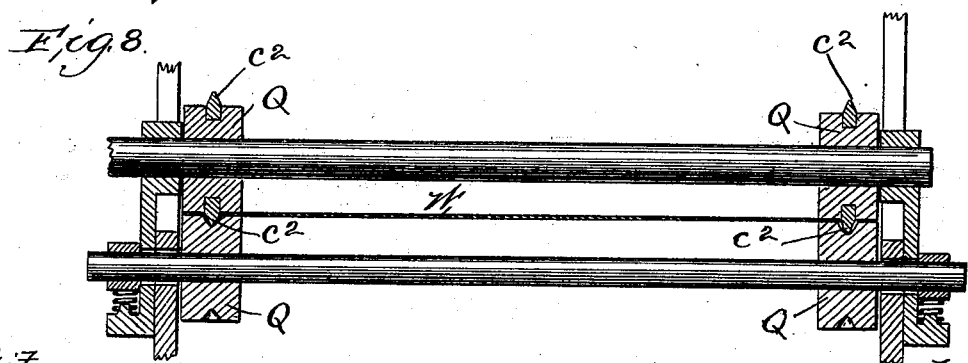
Witnesses:
Edward T. Wray.
Harry L. White.
Inventor:
Melville Clark
by Burton and Burton
his attys.

No. 698,104. Patented Apr. 22, 1902.
M. CLARK.
MACHINE FOR CUTTING PERFORATED SHEETS FOR AUTOMATIC MUSICAL INSTRUMENTS.
(Application filed May 2, 1898. Renewed Aug. 31, 1901.)
(No Model.) 6 Sheets—Sheet 6.

UNITED STATES PATENT OFFICE.

MELVILLE CLARK, OF CHICAGO, ILLINOIS.

MACHINE FOR CUTTING PERFORATED SHEETS FOR AUTOMATIC MUSICAL INSTRUMENTS.

SPECIFICATION forming part of Letters Patent No. 698,104, dated April 22, 1902.

Application filed May 2, 1898. Renewed August 31, 1901. Serial No. 73,951. (No model.)

*To all whom it may concern:*

Be it known that I, MELVILLE CLARK, a citizen of the United States of America, and a resident of Chicago, Cook county, State of Illinois, have invented certain new and useful Improvements in Machines for Cutting Perforated Sheets for Automatic Musical Instruments, of which the following is a specification, reference being had to the accompanying drawings, forming a part thereof.

This invention is designed to provide means for cutting the perforations in paper strips which are used to control the action of automatic musical instruments, such cutting being governed either by a sheet previously cut which acts as a master-piece or pattern or being governed by direct connection with the musical instrument on which the paper to be cut is being played.

Figure 1:
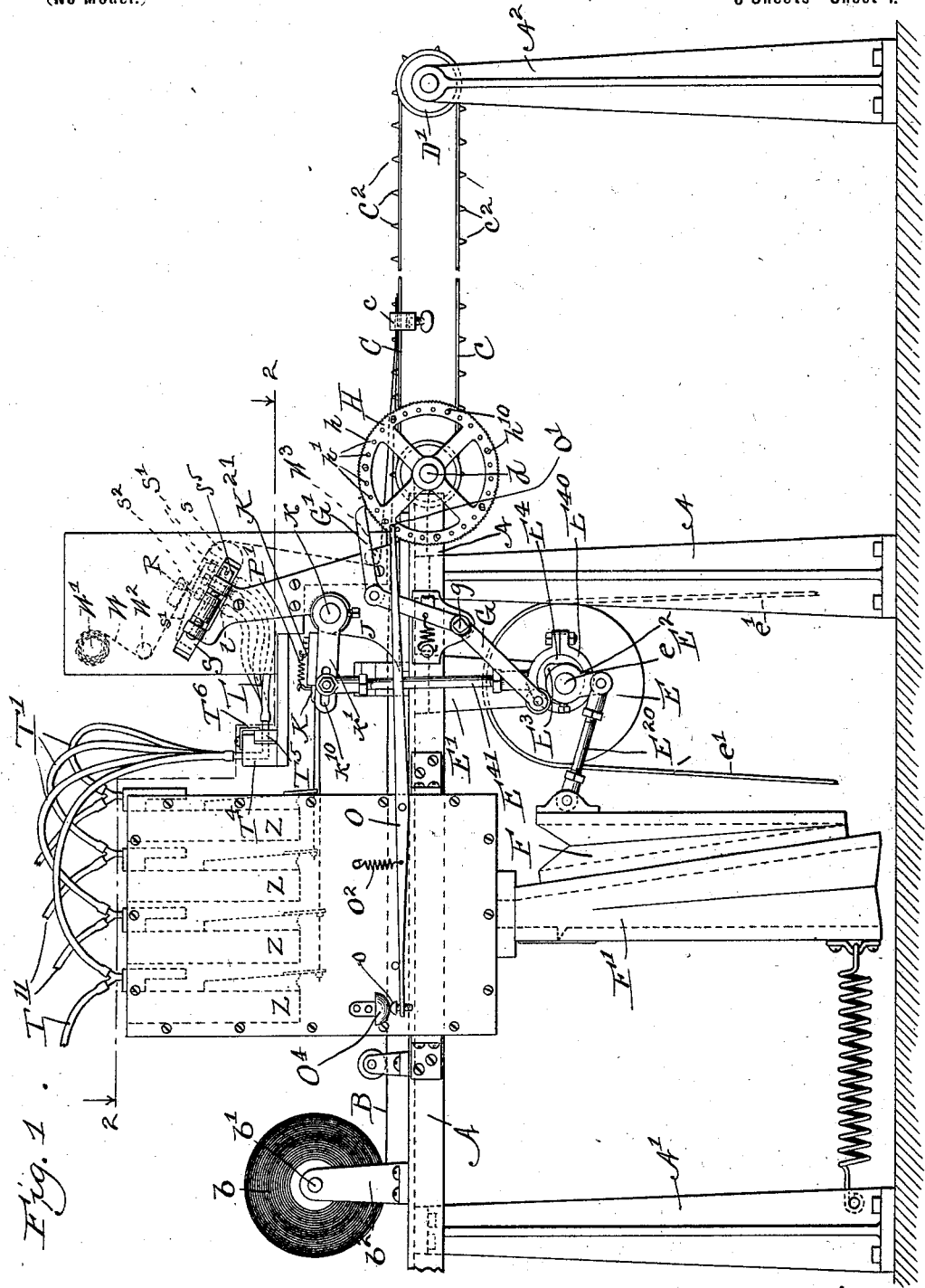
Figure 10:
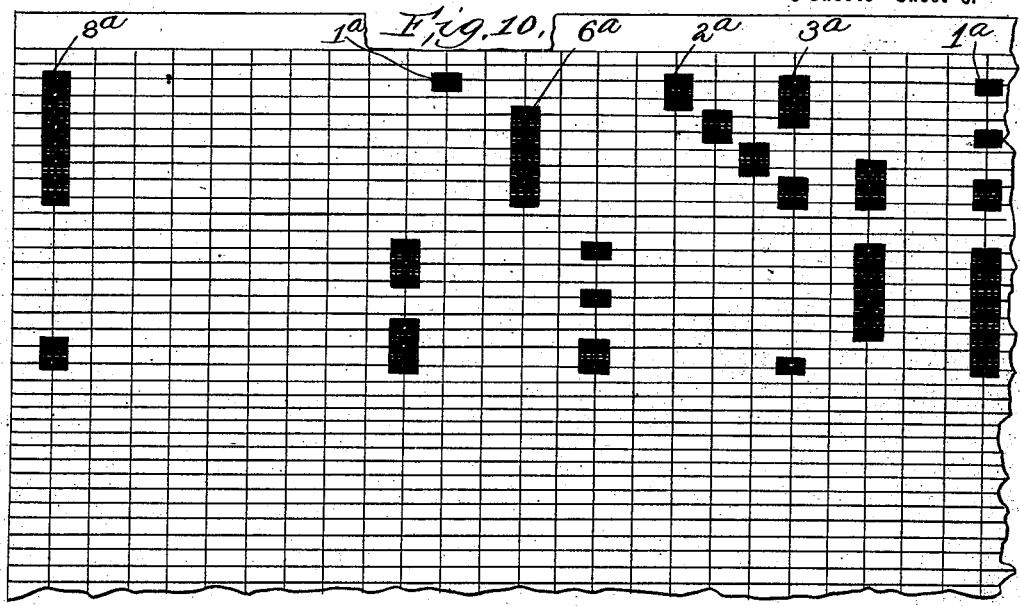
Figure 9:
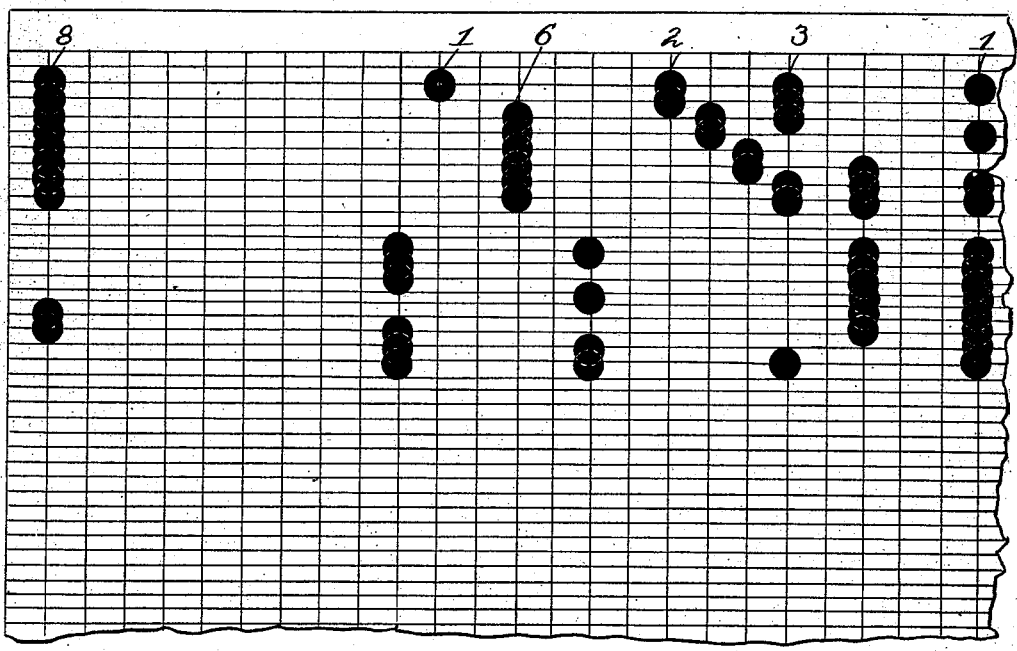

Figure 1 is a side elevation of my improved music-cutting machine, omitting the manual and connections therefrom. Fig. 2 is a top plan of the same, certain parts being broken away or removed to disclose other parts of the mechanism. Fig. 3 is a detail vertical section on the line 3 3 of Fig. 2. Fig. 4 is a detail side elevation of the portion of the machine having the manual to control its action, showing a portion of what is shown in Fig. 1, the two figures together being necessary to fully represent the machine in side elevation. Fig. 5 is a detail section at the plane of the line 5 5 on Fig. 3. Fig. 6 is a detail side elevation of a portion of the feed ratchet-wheel, showing in enlarged view the metronome operating stud-pins and the lever which they operate. Fig. 7 is a detail side elevation, on a larger scale than Fig. 1, showing the feeding mechanism for the paper sheet and a sprocket feed device for the master-piece, being a modification in this respect of the form shown in Fig. 1. Fig. 8 is a detail section at the line 8 8 on Fig. 7. Figs. 9 and 10 are respectively detail plans of portions of the music-sheet and a preferred form of master-piece for cutting the same, being in the nature of diagrams illustrating the relations of the apertures in said music-sheet and master-piece, respectively.

In my improved machine I employ a frame, upon which is mounted in suitable bearings a roll from which the paper is unwound as it is fed through the machine. This paper is drawn through the machine by being clamped at a point beyond the line of cutting to an endless belt which is fed with a step-by-step motion, the master-piece or pattern being clamped to the same belt and partaking of the step-by-step feed motion. The paper thus drawn from the roll by the belt passes between a transverse row of dies underneath it and a corresponding transverse row of punches above it, the punches being actuated to pierce the paper at proper points corresponding to the master-piece by the mechanism which comprises punch-selecting devices which are actuated by motor-pneumatics— that is, small bellows, such as are employed in pneumatic organs and termed "motor-pneumatics" in that class of structures, these motor-pneumatics being controlled and caused to act by the perforations in the master-piece in precisely the same manner as in pneumatically-operated musical instruments the motor-pneumatics or pneumatic keys are controlled to cause the reeds to speak by the perforated sheet. This action will, however, be particularly described presently.

In the drawings, A is the table or bed, supported on the standards A' A'.

$b$ is the paper-roll wound on the shaft $b'$, which is journaled in the standards $b^2 b^2$.

B is the paper running from the roll through the machine.

C C are endless belts driven by the roll D, mounted in suitable bearings at the end of the table A. These belts travel about a roller D', mounted in the standards $A^2 A^2$ at a distance from the end of the table A.

E is a pulley on the shaft $e$, which is journaled in hangers E' E' below the table, and $e'$ is a belt by which power is communicated to said pulley and shaft and thence to the mechanism on the table.

$E^2$ is a crank on the shaft $e$, which by means of a pitman $E^{20}$ actuates the pumping-bellows F to maintain a condition of rarefication of air in the bellows F' and wind-chest $F^2$. On the shaft $e$ and inside the crank $E^2$ is the cam $E^3$, which as the shaft revolves actuates the lever G, which is fulcrumed at $g$ on a suitable bracket depending from the table and at the upper end has a pawl G', whose nose engages the ratchet-rim $h$ of the wheel H, which is fastened on the end of the shaft $d$ of the roll D. The cam $E^3$ has single upraise $E^{30}$, being otherwise circular in its periphery, and it thereby actuates the lever G to give the pawl G' an advancing and a retreating movement once in each revolution of the shaft $e$, thereby advancing the belt C and paper $b$ one step for each such revolution. On the shaft $e$ inward from the cam $E^3$ is an eccentric $E^4$, whose collar or strap $E^{40}$ has a stem $E^{41}$. Extending up from the table are two standards J J, in which is journaled a rock-shaft $k$, having outside the standard a lever-arm $k'$, to which the end of the stem $E^{41}$ of the eccentric is pivotally attached at a slot $k^{10}$, whereat said pivotal connection may be adjusted to vary the stroke or angular action communicated by the eccentric to the rock-shaft.

K is a vibrating plate rigidly attached to the shaft $k$ between the standards J J and extending in an approximately horizontal direction from the shaft toward the paper-roll $b$. From this vibrating plate near its edge remote from the shaft there are suspended the punches L L L, &c., each punch being inserted down through a hole in the plate and stopped by a cross-pin $l$, set through the punch, the plate having a recess K', into which the cross-pins drop, so that the upper ends of the punches L do not extend above the upper face of the plate when the pins are stopped at the bottom of such recess.

M is a die-plate. It is mounted rigidly on the table some distance below the vibrating plate K and at a position such that the paper $b$, running from the roll to the belt C, passes over and in contact with its upper surface. Mounted above the die-plate and extending over its whole length is a guide-plate M' for the punches L, which all extend down through said guide-plate, which is therefore apertured for all the punches in vertical lines below the apertures of the vibrating plate K, at which the punches are suspended from the said plate. The guide-plate M' is fixed rigidly with respect to the die-plate M and a very short distance above the latter, and there is secured to it a stripper $M^2$, adapted to be adjusted vertically, so as to hold the paper as close to the surface of the die as necessary to prevent inaccuracy and also to strip it from the punches when they withdraw. It will be seen that if the punches L were attached to the vibrating plate K so as to be moved vertically by its vibration the paper would be perforated by every punch at every step of the feed movement communicated by the dog G' to the wheel H and belt C. The proper perforation of the paper depends upon the devices by which the punches are prevented from receiving the motion of the vibrating plate K except at the proper times, respectively. For this purpose there is secured to the upper side of the plate K a plate $K^2$, which is bolted rigidly to the plate K and moves with it. The plate $K^2$ has the transverse grooves or channels $K^{20}$ $K^{20}$, &c., corresponding in position to the apertures in the plate K, on which the punches L are hung, respectively, one slot $K^{20}$ being directly above each punch. These slots are occupied by slides P P P, &c. Each slide P has a notch $p$ in its lower edge, which overhangs the punch below it when the slide is thrust in the full depth of the slot. For each slide there is provided a spring P', suitably connected to it and to a pin $K^{21}$ on the block $K^2$, adapted to hold the slide inward to the limit of the slot, and thus to keep the notch $p$ overhanging the upper end of the punch. The depth of the notch $p$ is substantially equal to the range of vibrating movement of the plate K, and it will be seen therefore that so long as the notch overhangs the punch the vibration of the plate will not force the punch through the paper. If, however, any slide is withdrawn, so as to take the notch away from its position above the end of the punch, bringing the solid portion of the slide to that point, the vibration of the plate will cause the punch to be thrust downward through the paper.

The mechanism for controlling the punch-selecting slides P will now be described.

W is the master-piece or pattern which is to be reproduced. It is wound on and adapted to be unwound from a suitable roll W', mounted above the machine, thence guided about the roll $W^2$ under the bar R, which has a plain face on the under side, against which the paper rests as it travels, passing thence over the guiding-nose $s$ of the pneumatic valve-block S, and thence down around a guide-roll $W^3$, located a little above the plane of the traveling paper $b$, from which it passes to the clamps $c$, which fasten both it and the paper to the belt C. It will be seen that the master-piece W will be drawn by the feed movement of the belt C simultaneously and equally with the paper strip B. The bar R has apertures $r$ in a row transverse to the travel of the master-piece, one aperture corresponding to each note of the music and each line of perforations in the master-piece.

T T T, &c., are flexible tubes forming portions of ducts leading from the pneumatics, whose action will be hereinafter described. The tubes terminate in mouthpieces $t$ $t$, mounted in the block S and closed by valves S', &c. Each of these valves is mounted on a spring-stem $s'$, secured to the block S and adapted to withdraw the valve from the end of the mouthpiece which it is designed to close. Each of the valves is provided with a finger, which I term a "finder" $s^2$, projecting upward against the under side of the master-piece. This finger is conveniently made by forming an offset loop or return-bend in the wire, which forms the spring S'. These fingers stand in line transversely under the row of apertures $r$ in the block R, and whenever an aperture of the master-piece comes between the end of the finder and the aperture $r$ the restraint exerted by the master-piece upon the spring-stem $s'$ being removed the latter forces the finder up through the aperture and lifts the valve off the mouthpiece $t$ of the pneumatic-duct. The end of the finder is rounded, and the movement which it receives being scarcely more than the thickness of the paper of which the master-piece is made the traveling paper readily forces it out of the aperture and reseats the valve until another aperture reaches it. The ducts, which terminate in the mouthpieces $t$ $t$, lead to a transposing-board $T^4$ $T^5$, which will be presently described, and thence the tubes $T'$ $T'$, &c., lead, respectively, to primary pneumatics U U U, &c. The construction and action of these primary pneumatics and the motor-pneumatics associated with them are identical with that shown in my Patent No. 576,032 for improvements in pneumatic organs, dated January 26, 1897, and the action is one which is substantially familiar in pneumatic musical instruments, and a brief description will suffice. These primary pneumatics each control a motor-pneumatic V, the structure being such that when the duct of any primary pneumatic is opened, whereby the air is allowed to enter it, the primary pneumatic which has been collapsed through the action of the rarefied air reaching it from the wind-chest Z expands and, moving the valves $U'$ $U^2$, attached to it, closes the communication of the motor-pneumatic with the outer air and opens communication between such pneumatic and the rarefied air of the wind-chest, causing the motor-pneumatic to be collapsed. The moving wall of each motor-pneumatic is connected by a link $Z'$ to one of the slides P, and the collapse of the motor-pneumatic withdraws the slide to the position where it fills the space above the upper end of the punch, so that the vibrating movement of the plate K, which occurs at that instant, actuates the punch. It will be seen, therefore, that so long as any aperture in the master-piece is passing the point of any finder the valve $S'$, attached to such finder, being open and the motor-pneumatic connected with the duct controlled by such valve being collapsed, the slide or punch-selector connected to such motor-pneumatic and to which such aperture in the master-piece corresponds is moved into position to cause its punch to operate to produce a similar aperture in the strip $b$, and when the aperture in the master-piece has passed the point of the finder, the valve $S'$ being closed, the primary pneumatic rarefied and collapsed, and the motor-pneumatic expanded, the punch-selecting slide is thrust inward, its notch is brought above the punch, and the vibration of the plate no longer actuates the latter. The step motion communicated to both master-piece and the paper which is to be cut should be as short as practicable, and obviously it must not exceed the dimension of the punch in the direction of travel of the paper, because otherwise the punch could not cut continuous apertures, but each stroke would cut a detached aperture. It is practically much easier to produce and keep in good condition round punches than rectangular punches, and in order to cut this aperture with round punches the step movement is preferably only from a third to a half of the diameter of the punch, and even less than this would be desirable. Now with these considerations in mind it will be evident that in order that the paper should be cut precisely to correspond with the master-piece it is necessary that the finder should enter the aperture in the master-piece in such time with respect to the feed movement of the machine that the full value of the aperture will be obtained and no more—that is to say, that the punch will have opportunity to make only as many strokes while the finder is in a given aperture of the master-piece as were necessary to produce such aperture in the master-piece. This will be the case if the vibrating movement of the plate K, which actuates the punches, occurs when the finder stands in the aperture of the master-piece at the center of the cut made by the first stroke of the punch—that is, at the position precisely corresponding to that of the operating-punch in the new aperture which is being cut in the paper—because then each succeeding stroke of the punch will correspond to a similar position of the finder with respect to each succeeding portion of the aperture in the master-piece, and the finder will remain in the aperture precisely long enough to permit the punch to receive the exact number of strokes which were given to a like punch to make the aperture in the master-piece. Such accuracy involves, however, extreme exactness in the position of the master-piece, and inasmuch as the diameter of the punch is not to exceed one-tenth of an inch and the step feed movement in no case to exceed one-twentieth of an inch, and preferably less, it will be evident that any slight elongation of the master-piece which may be due to change of temperature or moisture will throw its aperture sufficiently out of the exact position in the travel of the master-piece and paper which should be occupied to prevent this accurate result. To overcome this difficulty and insure exactness in the position of the master-piece with relation to the feed and punching strokes of the machine, I provide the margins of the master-piece with rows of equally-spaced apertures $w$ $w$ $w$, &c., and I arm the feed-belt C with corresponding rows of pins $c^2$ $c^2$ $c^2$, &c., the pins being tapered or conical, being at the base where they emerge from the surface of the belt of the full diameter of the apertures. From this structure it results that as the master-piece, drawn by the belt from around the roller $W^2$, approaches the belt the points of the pins entering the apertures, if the paper is slightly stretched or slightly contracted, the taper of the pins entering them in the apertures as the paper is forced down close onto the belt, readjusts the paper at each pin-hole, either crowding it back or drawing it on, to compensate for the very minute variation which may have occurred in its length between consecutive holes. Thus the accumulation of errors which would result from contraction or elongation of the master-piece, which might amount in the length of it to the full diameter of a hole, and so be sufficient to disarrange the time of the music, is prevented and the entire error is distributed over the whole length and corrected step by step as the feeding proceeds.

In order to start the master-piece right—that is, so that the first aperture shall be entered by the finder at the proper point to correspond with the feeding action—it would be necessary in the absence of any special provision to obviate the necessity to exercise extreme care in attaching the master-piece to the feeding-belt C, since a variation amounting to a very small fraction of the diameter of the punch might be sufficient to cause two strokes of the punch to occur within a travel of the master-piece equal to one diameter of the punch. To obviate this necessity and provide a more practical means of insuring accuracy, I mount the block S on the frame of the machine, so that it may be adjusted in the direction of the line of travel of the master-piece past it, and provide an adjusting-screw $S^5$, by which it may be moved slightly and accurately in either direction after the master-piece has been clamped to the belt C to bring the initial apertures in proper relation to the finders to correspond with the feeding action of the belt.

I prefer to employ a master-piece which is not a facsimile of the music to be cut, but which differs from it in respect to the length—that is, dimension in the direction of travel of the perforations. The difference which is preferably made between the master-piece and the sheet to be cut may be understood from examination of Figs. 9 and 10, the latter of which represents a portion of a master-piece, while the former represents a corresponding portion of the music-sheet to be cut, both views being on a magnified scale. The perforations in the music-sheet are represented as having been made with round punches, that being the more convenient form of punch, the diameter of the punch, and therefore the diameter of the smallest aperture, such as 1, being twice the step feed movement of the sheet. The next larger aperture 2 is once and a half the length of the aperture 1, the position of the punch in the second stroke being indicated in dotted line, where it laps onto the farther half of the aperture cut by the first stroke. The next larger sized aperture 3 is twice the length of the aperture 1, the positions of the punch at the second and third strokes being indicated in dotted line.

Longer apertures, in which the several positions occupied by the punch at successive strokes are similarly represented, are shown at 6, which is made by six strokes, and at 8 made by eight strokes of the punch. If the action were perfect, the duration of tone would be precisely proportionate to the length of the aperture; but in practice when a sheet is moving continuously over the tracker-range a certain distance will be traveled in every instance after the aperture of the papers laps onto the aperture in the tracker-range before the mechanical movements necessary to cause the sounding devices to speak will have time to occur, so that practically a certain deduction must be made from the length of all the apertures, so that the remainders shall be proportionate to the duration of tones. Half the diameter of the minimum aperture—that is, half the diameter of the punch—practically represents this allowance which must be made, and therefore in practice the duration of tone produced by the aperture 2 is twice that produced by the aperture 1, although the aperture 2 is only once and a half as long as the aperture 1, and the same rule applies to all the various lengths of apertures. In working from a master-piece to produce the proper number of strokes of the punch if the apertures in the master-piece were facsimiles of those to be produced in the paper the result would be perfect if the time of the stroke of the punch corresponded accurately to the tone of registration of the center of the first complete circular element in the aperture of the master-piece—that is, the center of an aperture will be cut by a single stroke of the punch, since in that event each succeeding stroke would occur when the master-piece had traveled a distance equal to the radius of the punch.

Some of the difficulties in the way of insuring such perfect timing of said master-piece with the action of the machine have already been indicated, and to avoid the bad results of inaccuracy in this respect I prefer to make the master-piece not a facsimile of the sheet to be cut in respect to the apertures, but instead of making the apertures in the master-piece such as would be cut by successive strokes of a round punch, whose consecutive positions in making such strokes are separated by a distance equal to the radius of the punch, I make the apertures such as might be cut by a rectangular punch, whose dimension in the direction of travel is very slightly more than the length of the step feed movement, so that if the successive positions of such a punch in cutting such apertures in the master-piece were all represented they would overlap only perceptibly and not half the diameter in the direction of travel, as in the case of the apertures cut by the round punches, as shown at Fig. 9.

In Fig. 10 I have illustrated apertures of a master-piece corresponding to apertures 1, 2, 3, 6, and 8 of the music-sheet shown in Fig. 9, said apertures being denoted, respectively, as $1^a$, $2^a$, $3^a$, $6^a$, and $8^a$, the centers of the several increments or elements of these apertures being indicated by dots corresponding to the centers of the dotted-outline elements of the corresponding apertures in Fig. 9. A finder or other equivalent means of causing the apertures in the master-piece to control the action of the punches in a machine, if it registers properly with the center points thus indicated in the master-piece apertures at instants corresponding to the punch-operating action of the machine, will cause the punches to cut in the music-sheet apertures made up of precisely the same number of elements or requiring precisely the same number of strokes of the round punch as there are rectangular elements indicated by the dots showing their centers, respectively, in such apertures in the master-piece, and even if the action should start with the finder just barely over the edge line of the aperture still the number of strokes will be the same as the number of elements of which the entire aperture is made, because although the action will be started prematurely to the extent that the punch is actuated before the finder is at the center of the first element of the master-piece yet the termination will be similarly premature, because the step movement from that point in the last element will carry the finder beyond the end of the aperture onto the solid paper. This result will be obtained with absolute certainty if the lap of the successive rectangular elements or supposed strokes of a rectangular punch in cutting the master-piece apertures is less than the diameter of the point of the finder, as in practice I make it. It will be evident that the round punch cannot be employed in cutting the master-piece in this way, because so slight a lap of the successive positions of the round punch would make the aperture continuous only through the center, where very slight segments of successive round holes would lap, and a very slight lateral inaccuracy in the position of the finders would cause them to miss the open track and run onto the points of the paper protruding between. From this consideration it will be understood that there is an additional advantage in the use of rectangular punches producing rectangular apertures in the master-piece—to wit, that lateral deviation of the finders from correct paths central with respect to the apertures of the transverse dimensions produce no effect upon the result, provided such deviation from central line is less than the difference between half the width of the aperture and the radius of the point of the finder. In practice it is advantageous and contributes still further to the avoidance of errors through inaccuracy to make the master-piece on a larger scale transversely than the music to be cut, the finders and controlling devices at the tracker-range being correspondingly spread. By this means finders of larger diameter may be employed without increasing liability to error, and correspondingly greater lap of the successive elements in the rectangular apertures may be allowed in making the master-piece.

My machine may be adapted to cut music without the use of a master-piece or pattern-sheet, but by use of a manual or keyboard corresponding to the keyboard of the instrument on which the perforated music is to be used, the keys of such manual being arranged to operate vent-valves for the primary pneumatics instead of having such vent-valves, as S', operated by the master-piece. In Fig. 4 I have shown the necessary additions to adapt the machine to be used in this manner. These additions consist of, first, an additional set of tubes T" T", &c., leading from the primary pneumatics U U, &c., such tubes corresponding to the tubes T' T', above described, and leading to a board T², where the mouths of the tubes are closed by valves T³, operated by the keys of the manual T⁴, respectively. It will be evident that upon depression of any key of the manual the primary pneumatic corresponding to it will be vented precisely as it would be vented by the opening of the valve S' under control of the master-piece. The machine thus constructed could, therefore, be operated either by a master-piece or by an operator fingering the manual. When the latter method is followed, the operator will play the piece to be reproduced—that is, manipulate the keys of the manual as if it were the manual of a speaking instrument, but in time corresponding to the mechanical movement of the machine, which practically must be very much slower than the time for which the music is designed. To illustrate, if the step feed movement caused by the pawl G' engaging the wheel H corresponds to a one sixty-fourth note, so that a quarter-note, for example, will require sixteen strokes of the punch, the operator manipulating the manual to produce the aperture corresponding to a quarter-note must hold the key depressed for a time equal to that occupied by sixteen strokes, and it is not practicable to run the machine fast enough to make these sixteen strokes in the usual time of a quarter-note of music, even when the slowest time is considered; but by providing a metronome attachment whose movements are controlled by the feed mechanism of the machine the operator manipulating the keyboard to control the cut will be able to keep in time with the machine, and thus produce a perforated sheet by means of which the music may be played in any time desired, according to the speed at which it is fed over the tracker-range in the instrument. Such metronome attachment may consist of a trip-lever O, having a tail O' extending into the path of the trip-pins $h'$ $h'$, &c., on the wheel H, and said wheel may be provided with a multiplicity of apertures corresponding to the ratchet-teeth, so that the trip-pins may be inserted in selected apertures, so as to trip the lever and produce the vibration of the metronome-indicator at intervals corresponding to the time in which the music is written. A spring $O^2$ tends to hold the tail of the lever bearing on pins as the wheel H revolves, so that the lever is lifted by each pin as it passes it, the opposite end, having a hammer $o$, being retracted against the bell $O^4$ as the tail of the lever slips off the pin. The stroke of the bell is thus made for every beat of the music, and in order that accented beats may be given in order to assist the operator in keeping his place in the music pins corresponding to these beats have an enlargement $h^{10}$ at one side, so that they lift the tail of the lever sooner and farther, but being cut off straight at the side on which the lever runs off the pin they drop it at the same time as if it had been carried up by a smaller pin, thus giving a louder stroke, but preserving the intervals.

The manual employed to control the punch-selectors may be the manual of an actual instrument—that is, it may have full equipment of sounding devices—so that the manipulator shall hear the tone corresponding to the keys operated, and thereby be enabled to avoid errors. The ducts $T''$ in such instrument become merely branch conduits from the primary-pneumatic vent-ducts of a pneumatic-organ, which may be located in any convenient relation to the perforating-machine proper. I have therefore shown in Fig. 4 the sounding devices operated by the keys $T^4$—to wit, a block of reed-chambers $T^6$, reed-valve $T^7$, and the pneumatic operating devices for the same. The particular structure herein illustrated is that shown in my Patent No. 603,127, dated April 26, 1898, and not being specifically a part of the present invention it need not be further described here in detail.

For the purpose of extreme accuracy in the music to be cut it may be desirable to employ a master-piece made longitudinally on a larger scale than the sheet which is to be produced, and I have shown in Figs. 7 and 8 a modification of the mechanism such as it is desirable to employ when the master-piece is thus enlarged, and I prefer to make it in such cases on twice the scale of the music. In the structure shown in these figures the master-piece instead of being clamped to the belt C is independently fed by sprocket-wheels Q Q, mounted on the block S at the delivery side and actuated with a step-by-step movement corresponding identically to that of the belt C by means of a pawl $G^2$, connected to an extension $G^3$ of the lever G, the movement thus communicated being double that of the belt C. The teeth of the sprocket-wheels Q Q take into the apertures $w$ in the margins of the master-piece, and thereby feed the latter positively with a step-by-step movement double that which is given to the paper B. The perforations in the master-piece being also double in length those which are desired in the music which is to be cut, the result will be the same as when a master-piece of the same size as the music to be cut is fed at the same speed; but the inaccuracies, if any, in the master-piece or in the feeding will produce only half the effect, and in many cases will produce no effect at all in the music cut.

If it should be desired to substitute electromagnets for the pneumatic action for operating the punch-selectors, the armatures of such electromagnets operating in the same manner as the moving walls of the motor-pneumatics, this may be done by extending across the machine above the spring-stems $s'$ of the valves S a metal rod $S^4$, suitably insulated from the remainder of the machine and connected to one pole of the magnet-energizing battery, while from each of the springs a wire extends to the electromagnet which is substituted for the motor-pneumatic corresponding to the note to which such spring relates. This construction will cause the magnet which controls the punch-selector for any given note to be actuated and to actuate such punch-selector whenever the spring corresponding to that note is brought into contact with the bar $S^4$, which will happen when the finding-point of the spring enters an aperture in the master-piece.

For the purpose of transposing music—that is, using a master-piece cut in one key for the purpose of producing a perforated sheet cut in a different key—I interpose the transposing-board $T^4$ $T^5$ in the air connection between the primary pneumatics and the mouthpieces $t$. This transposing-board comprises a bar $T^4$, having the channels $t^4$, into which the tubes $T'$ are connected, and a bar $T^5$, having channels $t^5$, into which the tubes T are connected, the two bars being adapted to seat one upon the other with their ducts $t^4$ $t^5$ registering, the bars on their abutting surfaces being suitably faced with felt or other suitable substance to adapt them to seat air-tight, and the bar $T^5$ being retained on the bar $T^4$ by the angle-piece $T^6$ and adapted to slide longitudinally thereon. By moving the block $T^5$ longitudinally it will be seen that its ducts $t^5$ may be made to register with the ducts $t^4$ of the bar $T^4$ in any manner desired—that is, for example, a duct $t^5$, which corresponds to a given note, as C in the master-piece, may be set to register either with the duct $t^4$ of the bar $T^4$ pertaining to the pneumatic which actuates the punch-selector corresponding to the same note C, or by moving the slide $T^5$ one point it may be made to register with the punch-selector corresponding to C♯, for example, or by moving it five points it may be made to register with the duct pertaining to the pneumatic which actuates the punch-selector corresponding to the note F above C. Thus any transposition desired may be effected.

I claim—

1. In a music-perforating machine, an assemblage of punches corresponding to longitudinal lines on which perforations are to be made; a carrier for the punches, and mechanism for actuating such carrier; punch-selectors, one for each punch, and motors for actuating such selectors; conductors corresponding to the motors, and a support for the terminals of such conductors; and a master-piece traveling over the terminals on such support and acting upon the terminals to control the motors.

2. In a music-perforating machine, an assemblage of punches corresponding to longitudinal lines on which perforations are to be made; a carrier for the punches, and mechanism for actuating such carrier; punch-selectors, one for each punch, and pneumatics for actuating the punch-selectors; ducts from the pneumatics, and a mouthpiece to which they lead; and a master-piece traveling over the mouthpiece, for controlling the pneumatics.

3. In a music-perforating machine, an assemblage of punches corresponding to all longitudinal lines on which perforations are to be made; a carrier for the punches and mechanism for actuating such carrier; punch-selectors, one for each punch, and motors for actuating such selectors; conductors from the motors and a terminal-support to which they lead; a master-piece traveling over the terminal-support acting upon the terminals to control the motors, such terminal-support being adjustable relatively to the master-piece in the direction of the travel of the latter.

4. In a music-perforating machine, an assemblage of punches corresponding to all longitudinal lines on which perforations are to be made; a carrier for the punches and mechanism for actuating such carrier; punch-selectors, one for each punch, and pneumatics for actuating the punch-selectors; ducts from the pneumatics, and a mouthpiece-board to which they lead; a master-piece traveling over the mouthpiece-board for controlling the pneumatics, such mouthpiece-board being adjustable relatively to the master-piece in the line of travel thereof.

5. In combination with the punches and means for feeding the paper past them, the punch-selectors and motors which actuate them; conductors for the motive fluid and terminals for such conductors; a master-piece and suitable means for giving it travel, and finders on the terminals respectively protruding against the master-piece and adapted to enter the apertures therein.

6. In combination with the punches and means for feeding the paper past them, the punch-selectors and motor-pneumatics which actuate them, and primary pneumatics which control the motor-pneumatics; the mouthpiece-board and ducts therefrom to the primary pneumatics respectively; automatically-opening valves which close the mouths of such ducts, and finders carried by the valves and protruding against the master-piece, whereby the master-piece holds the valves closed, such finders being adapted to enter the apertures in the master-piece to permit the valves to open.

7. In a perforating-machine which is controlled by a master-piece, the perforating-punches and devices which control their selection and action comprising motive-fluid conductors having terminals which are controlled by the master-piece; a two-part transposing-board, the conductors extending to one of said parts from the punch-controlling mechanism and to the other of said parts from the master-piece-controlled terminals, said conductors in said transposing-board members being all equally spaced and those of one member being adapted to register with those of the other, one member being movable with respect to the other to shift the registration of the conductors.

8. In a pneumatically-controlled perforating-machine, a two-part transposing-board; the primary pneumatics and ducts therefrom to one member of such board; a master-piece and a mouthpiece-board over which it travels, and ducts from the other member of the transposing-board to such mouthpiece-board, the ducts in said transposing-board members being all equally spaced, and those of one member being adapted to register with those of the other, one member being movable longitudinally with respect to the other to shift the registration of the ducts.

9. In a music-perforating machine, an assemblage of punches corresponding to all longitudinal lines on which perforations are to be made, the carrier for the punches and mechanism for actuating it; a punch-selector for each punch, and devices for actuating the punch-selectors; the manual and connections therefrom to the punch-selector-actuating devices respectively, adapted to bring said devices into action upon the depression of corresponding keys of the manual respectively, and a metronome-indicator actuated by the feeding and punch-actuating mechanism, whereby the operator may manipulate the manual in time with the feeding and punch-actuating movements of the machine.

10. In a music-perforating machine, in combination with the punches, and mechanism for selecting and mechanism for actuating the punches; a master-piece which controls the punch-selecting mechanism; and a feeding device for such master-piece, the master-piece having lateral rows of feed-apertures and the feeding device having corresponding rows of tapered feed-pins, which at the base are of the full size of the feed-apertures of the master-piece; the apertures and pins being equally spaced on the master-piece and feed device respectively.

11. In a music-perforating machine, in combination with the punches and mechanism for actuating them, the punch-selecting mechanism and the master-piece which controls it, the paper-feeding mechanism operated step by step synchronously with the punching mechanism, the master-piece being wider than the paper and provided with lateral rows of equally-spaced feed-apertures beyond the margins of the paper, the feeding devices consisting of a belt wider than the paper and provided with lateral rows of taper-pointed feed-teeth spaced equally with the apertures of the master-piece, the paper and master-piece being both clamped to the feed-belt and simultaneously actuated thereby, the feed-teeth of the belt being adapted to enter and at their base to fill the apertures in the master-piece.

12. In a music-perforating machine, a master-piece provided with apertures having their dimensions in the direction of travel of the master-piece multiples of a certain minimum distance, plus a certain excess which is small relatively to said distance.

13. In a perforating-machine, the master-piece provided with apertures which control the action of the machine, whose dimensions in the direction of travel of the master-piece are multiples of a certain minimum distance plus a certain excess which is small relatively to said minimum distance, in combination with finders adapted to enter the apertures, having their diameter, or dimension in the line of the master-piece travel, somewhat greater than said excess.

In testimony whereof I have hereunto set my hand, at Chicago, Illinois, this 28th day of April, 1898.

MELVILLE CLARK.

Witnesses:
CHAS. S. BURTON,
BERTHA C. SIMS.